Aug. 9, 1927. 1,638,610
C. A. BAKER
VENTILATING SCREEN FOR AUTOMOBILES
Filed Nov. 18, 1925    2 Sheets-Sheet 2
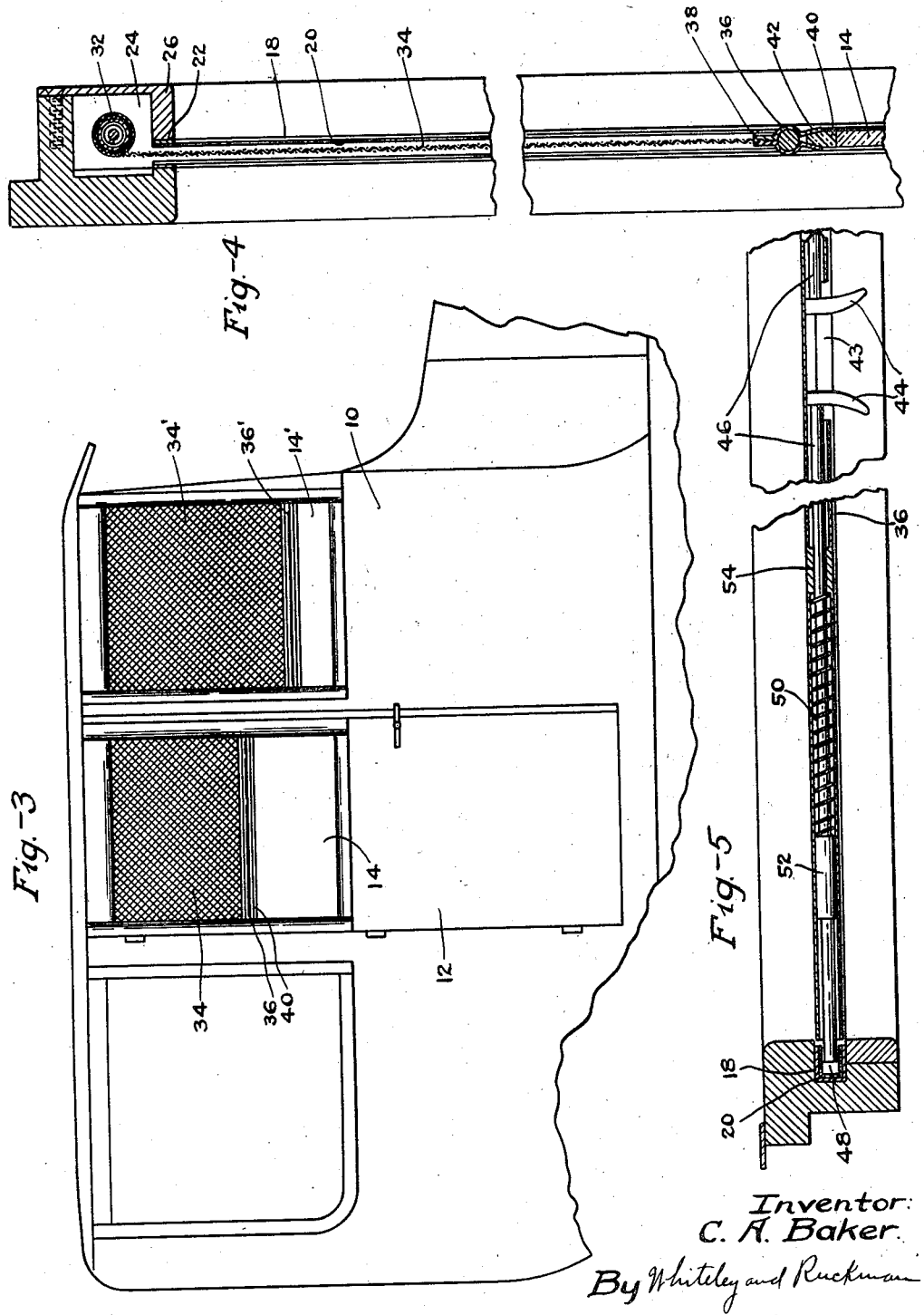
Inventor:
C. A. Baker.
By Whiteley and Ruckman
Attorneys.

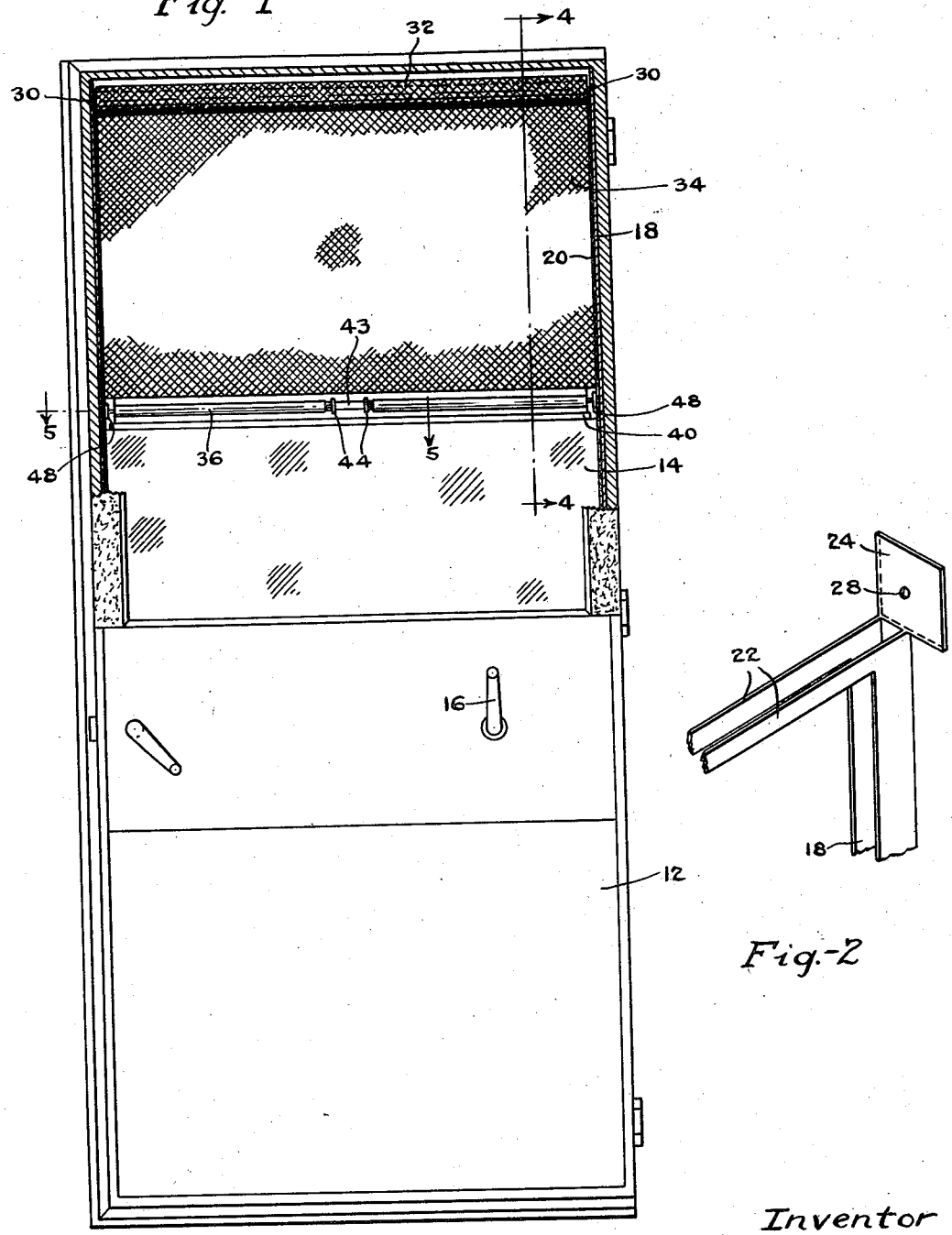

Patented Aug. 9, 1927.

1,638,610

UNITED STATES PATENT OFFICE.

CLAIR A. BAKER, OF DETROIT, MINNESOTA.

VENTILATING SCREEN FOR AUTOMOBILES.

Application filed November 18, 1925. Serial No. 69,783.

My invention relates to ventilating screens for automobiles. An object in general is to provide fine mesh wire screens for the side window openings of the car which will cut down side drafts and yet allow sufficient ventilation. I am aware that it has been proposed to provide roller screens for use at the front of the car when the windshield is open, and to provide frames having screening material held thereby which may be substituted in place of the customary glass windows in the window openings at the sides of the car. But it is inconvenient to carry extra screen frames which have to be stowed when it is desired to close the windows. Furthermore, I have found that when adequate provision is made for ventilation at the sides of the car, it is not usually desirable to open the windshield. A particular object of my invention, therefore, is to provide roller screens mounted above the side window openings which when the glass window is lowered can be pulled down a corresponding amount to cover the portion of the window opening out of which the glass window has been lowered. It will be understood that on account of the difference in construction and operation of the side windows, as compared with the windshield, it is necessary to provide a different arrangement of roller screen.

The full objects and advantages of my invention will appear in connection with the detailed description thereof, and the novel features embodied in my inventive idea will be particularly pointed out in the claim.

In the accompanying drawings which illustrate a practical embodiment of my invention,—

Fig. 1 is an elevational view of the inside of an automobile door with the upper portion in section and with my invention applied thereto. Fig. 2 is a fragmentary perspective view illustrating a metal construction which is placed around the window openings. Fig. 3 is a side elevational view of an automobile body showing my invention applied thereto. Fig. 4 is a view in section on the line 4—4 of Fig. 1. Fig. 5 is a view in section on the line 5—5 of Fig. 1.

Referring to the construction shown in the drawings, the numeral 10 designates in general the body portion of an automobile which may be any closed type of car having any number of doors, one of which is designated in general by the numeral 12. As is customary, the upper portion of the door has a window opening provided with a glass window 14 which may be raised and lowered by turning a handle 16. The glass window at its side edges slides in grooves in the frame, these grooves containing metal U-shaped members 18 lined with strips of felt 20 to make a tight joint with the side edges of the window. It will be understood that U-shaped members 18 are placed at two sides of the window opening. As best shown in Fig. 2, the two U-shaped members 18 are connected at the top by spaced strips 22 between which the upper end of the glass window may be raised. At the two corners where the strips 22 join with the members 18 the metal is extended upwardly to form plates 24 which are set into the space above the window opening. This space is closed by a removable angular member 26 placed at the side thereof. The plates 24 are provided with apertures 28 for receiving pintles 30 on the ends of a customary spring-actuated curtain roller 32 to which the upper end of a fine mesh wire screen 34 is secured. The lower end of this screen is secured to a horizontal tubular member 36 in any suitable manner as by means of flanges 38 on said member as shown in Fig. 4. A strip 40 of flexible material such as rubber or felt is secured to the lower side of the tubular member 36 in any suitable manner as by means of flanges 42 on said member. The central portion of the tubular member 36 is provided with a slot 43 in which work two finger pieces 44 secured to the inner ends of rods 46 slidably mounted in the tubular member. The outer ends of these rods are provided with enlargements 48 which operate in the side grooves of the frame provided for the side edges of the window. The rods 46 are normally held outwardly in clamping engagement by coiled springs 50 placed between shoulder members 52 on the rods and shoulder members 54 on the inside of the tube 36. While my invention has been described in connection with the window of an automobile door, it will be understood from Fig. 3 that the invention my be used in connection with a side window which is not carried by a door of the car. In this figure, 14' designates a window of this character while the wire screen and the tubular member at the lower end thereof are designated respectively as 34' and 36'.

The operation and advantages of my invention will be readily understood. Access to the space above the window opening in which the spring actuated roller is placed may be readily obtained by taking off the removable member 26. When it is desired to have the window entirely closed, the wire screen will be wound up on the roller with the upper edge of the glass in engagement with the flexible strip 40. The glass can be lowered to any desired position and then by pinching the finger pieces 44 together, the clamping rods 46 will be drawn inwardly, thus releasing the screen so that it can be pulled down to bring the flexible strip 40 into engagement with the upper edge of the glass thereby making a substantially tight joint therewith. Adequate ventilation for the interior of the car is thus provided for and at the same time side drafts are cut down. The wire screen also serves to exclude insects and to a large extent dust which would otherwise blow in. When the automobile is of the convertible type, having provision for sleeping quarters at night, lowering of the wire screens will provide for adequate ventilation and will exclude insects. It will be noted that the tube 36 serves as a stiffening member for the screen and also carries clamping means which serve to hold this member adjacent the upper edge of the slidable member so that the space out of which the window is lowered will be fully covered by the screen. The ends of the rods 46 even when released from clamping engagement, still remain in the side grooves and constitute guides so that the unwound portion of the roller screen is maintained in proper flat condition.

I claim:

In combination with the window opening of an automobile provided with a slidable window, a spring-actuated roller mounted above said window openings, a fine mesh screen secured at its upper end to said roller, a horizontally extending tubular stiffening member to which the lower end of said screen is secured, spring-actuated clamping rods slidably mounted in said tubular member and having ends extending into the customary side grooves provided for the slidable window, and a flexible strip secured to the lower side of said tubular member for engagement with the upper edge of said slidable window when said screen is held in lowered position by said clamping rods.

In testimony whereof I hereunto affix my signature.

CLAIR A. BAKER.